J. W. & G. F. BURGESS.
TIRE FASTENING MEANS.
APPLICATION FILED MAY 15, 1914.

1,134,313.

Patented Apr. 6, 1915.
2 SHEETS—SHEET 1.

John W. Burgess &
George F. Burgess,
Inventors

Witnesses by

Attorneys

J. W. & G. F. BURGESS.
TIRE FASTENING MEANS.
APPLICATION FILED MAY 15, 1914.
1,134,313.
Patented Apr. 6, 1915.
2 SHEETS—SHEET 2.
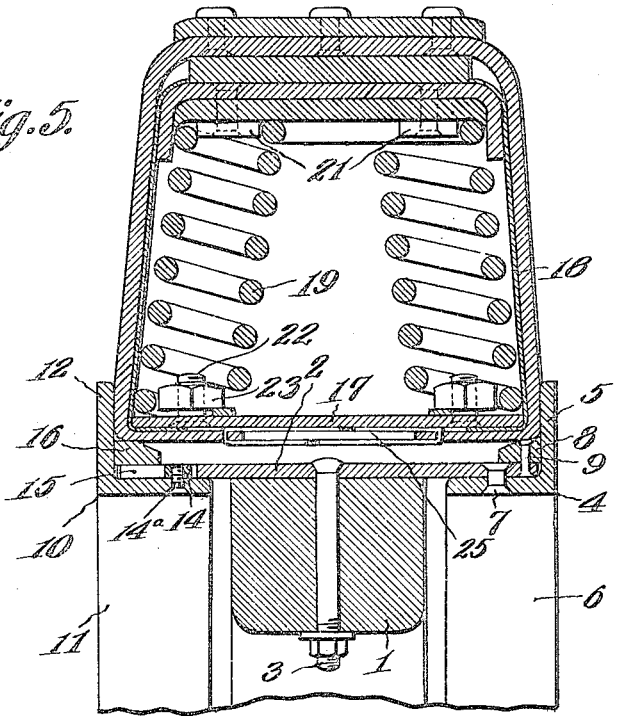
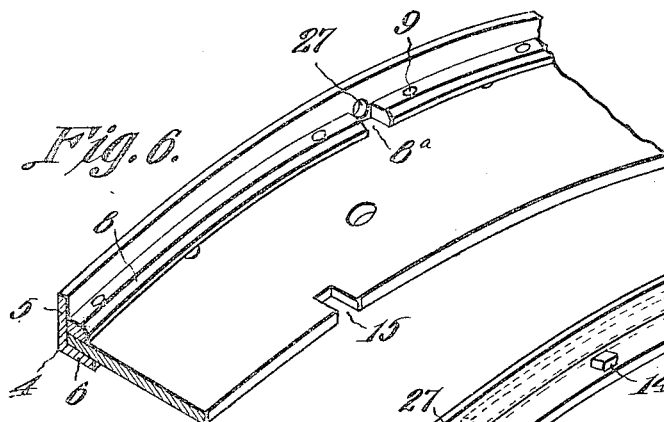
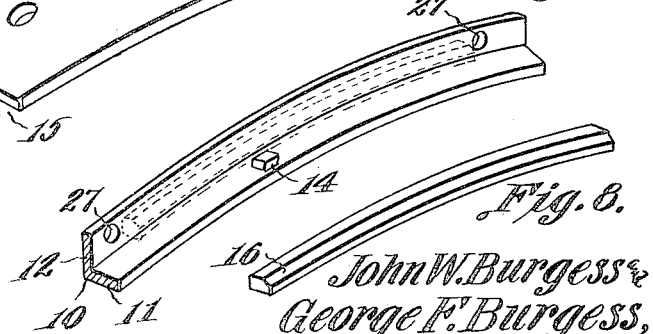
John W. Burgess
George F. Burgess,
Inventors
Witnesses
by C. A. Snow & Co.
Attorneys

UNITED STATES PATENT OFFICE.

JOHN W. BURGESS AND GEORGE F. BURGESS, OF BROOKFIELD, MISSOURI.

TIRE-FASTENING MEANS.

1,134,313.      Specification of Letters Patent.     Patented Apr. 6, 1915.

Application filed May 15, 1914. Serial No. 838,795.

Be it known that we, JOHN W. BURGESS and GEORGE F. BURGESS, citizens of the United States, residing at Brookfield, in the county of Linn and State of Missouri, have invented a new and useful Tire-Fastening Means, of which the following is a specification.

The device forming the subject matter of this application is a resilient wheel, and the present invention aims particularly to provide a fastening means in the form of a separable rim, adapted to hold in place and retain a tire of such a construction as that outlined hereinafter.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
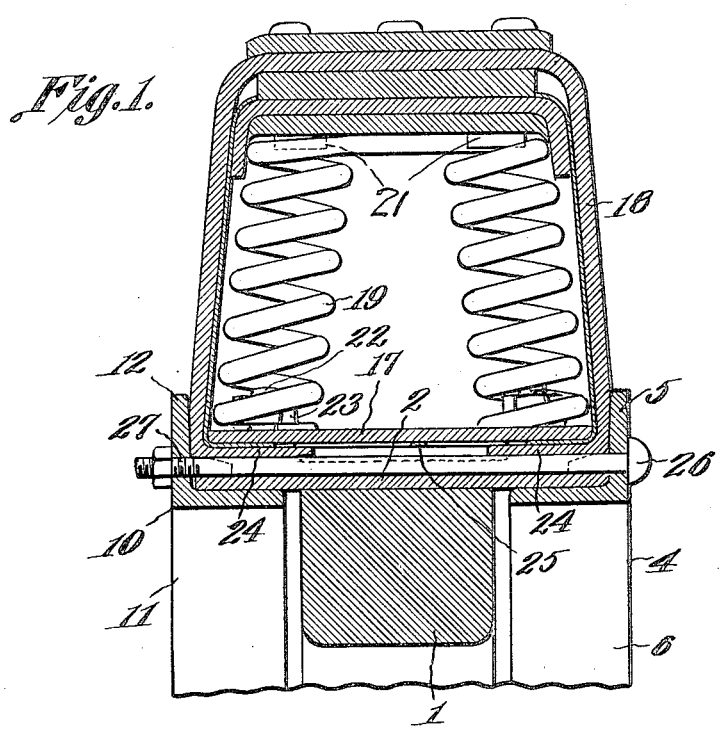
Figure 2:
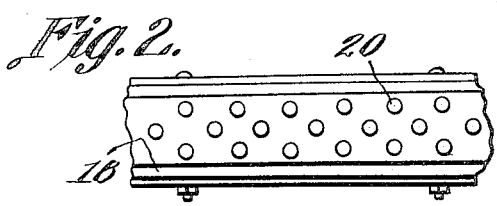
Figure 3:
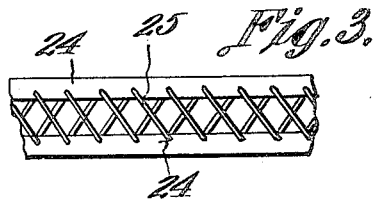
Figure 4:
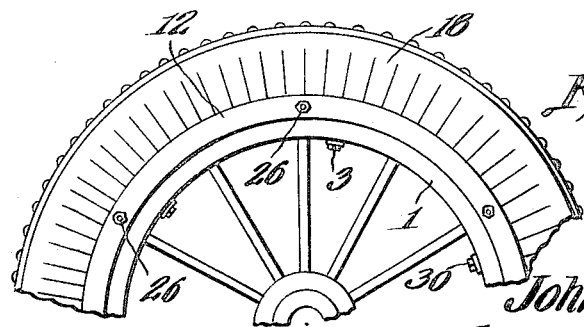

In the accompanying drawings:—Figure 1 shows the invention in transverse section; Fig. 2 is a top plan view of the tire; Fig. 3 is a bottom plan view of the tire; Fig. 4 is a side elevation illustrating a portion of a wheel equipped with the device forming the subject matter of this application; Fig. 5 is a transverse section of the tire and accessory parts; Fig. 6 is a detail perspective illustrating a portion of the rim band and attendant parts; Fig. 7 is a detail perspective illustrating a portion of one of the bead strips; Fig. 8 is a detail perspective showing a portion of one of the binding strips.

In the accompanying drawings the numeral 1 indicates a felly of any desired construction, the same being surrounded by a rim 2 in the form of a band, the rim projecting laterally beyond the upright edges of the felly 1. Bolts 3 or other securing elements adapted to a like end may be employed for securing the rim band 2 to the felly 1.

The invention includes a bead denoted generally by the numeral 4 and in transverse section taking the form of an angle member, the bead 4 comprising an upright flange 5 and a transverse flange 6. The upright flange 5 of the bead 4 lies along one edge of the rim band 2 and the transverse flange 6 of the bead 4 engages the inner face of the rim band 2. By means of rivets 7 or the like, the transverse flange 6 of the bead 4 is permanently attached to the rim band 2. A binding strip 8, preferably formed in a plurality of sections lies in the angle defined by the flange 5 and the rim 2, the binding strip 8 being secured to the rim band 2 by means of attaching elements 9 which may be rivets. In transverse section, the binding strip 8 is of wedge shape, as clearly shown in Figs. 1 and 5. As clearly shown in Fig. 6, the ends of the constituent portions of the binding strip 8 are spaced apart to define openings $8^a$, the functions of which will be made manifest hereinafter. From the description as thus far given, it will be obvious that the rim band 2 is provided along one edge with a fixed, tire engaging bead represented by the element 4.

The invention further includes a removable bead denoted by the numeral 10, the bead 10 being in the form of an angle member and comprising a transverse flange 11 and an upright flange 12, the upright flange 12 lying along one edge of the rim band 2 and the transverse flange 11 engaging the inner face of the rim band. In order to prevent the bead 10 from creeping circumferentially on the rim band 2, the flange 11 of the bead 10 may be equipped at any number of points with lugs 14 adapted to engage in notches 15 formed in one edge of the rim band 2. The lugs 14 may be formed in any desired manner, but if in the process of manufacture it should be found difficult to form the lugs 14 integrally with the bead 10, the lugs 14 may be held upon the flange 11 of the bead 10 by means of securing elements $14^a$ as clearly outlined in Fig. 5. A wedge strip 16 rests upon the rim band 2 and is lodged in the angle defined by the rim band and the flange 12. This wedge or binding strip 16 is removable and preferably comprises a plurality of sections as hereinbefore described, the opening $8^a$ in the binding strip 8 being noted again at this point.

The tire is a composite structure and comprises a base plate 17 and a casing 18. Since the fastening means constituting the subject matter of this application cannot be characterized patentably by any form of tire or tire casing, an extended description of the tire casing is unnecessary, the casing, ordinarily, being fashioned from rubber, leather, canvas or a combination of these materials, and comprising a suitable tread surface 20. Compression springs 19 are interposed between the tread portion of the casing 18 and the base plate 17. The tread portion of the casing 18 is provided with lugs 21 receiving the outer ends of the springs 19. Bolts or studs 22 are secured to the base plate 17 and nuts 23 on the bolts 22 engage the inner ends of the springs 19 and hold the same to the base plate 17. The edges of the casing 18 are carried inwardly between the base plate 17 and the rim 2 as shown at 24 and are united by a lacing cord 25 or in any other manner. The edges 24 of the casing 18 are engaged by the wedge or binding strips 8 and 16, as Figs. 1 and 5 will make manifest.

Openings 27 are formed in the flanges 12 and 5 of the beads 10 and 4, these openings 27 being alined with the spaces 8$^a$ between the constituent sections of the binding strips as will be understood clearly from Fig. 6. Through the openings 27 pass securing bolts 26, the function of the bolts 26 being to hold the removable bead 10 in place and to render the bead 10 efficient as a means for advancing the wedge or binding strip 16.

In practical operation, the tire comprising the casing 18, the base plate 17 and accessory parts is slid to the right in Figs. 1 and 5 until the same engages with the binding strip 8. Then the binding strip 16 is interposed between one of the edges 24 of the casing and the rim band 2. Subsequently, the bead 10 is applied, the bolts 27 are inserted and tightened up, by the operation above described, the tire will be crowded laterally against the flange 5 and will be caused to ride upon the wedge shaped binding strip 8, the wedge shaped binding strip 16 being advanced into place and being held by the action of the flange 12 of the bead 10.

From the foregoing it will be obvious that by mounting the wedge or binding strip 16 in place by advancing the band 10 transversely through the medium of the bolts 26, the tire will be held securely in place, demountably. Not only is the tire held in place, generally considered, but, by the action of the binding strips 16 and 8, the edges 24 of the casing 18 are bound firmly against the base plate 17 and the strain, to a large extent is removed from the lacing cord 25.

Having thus described the invention, what is claimed is:—

1. In a device of the class described, a felly; a rim band thereon and having its lateral edges disposed beyond the side faces of the felly, one of the lateral edges of the rim band being provided with an opening; angle members comprising upright flanges, and transverse flanges coacting with the inner face of the rim band; securing elements carried by the transverse flanges of the angle members, one securing element being permanently connected with the rim band and the other securing element being movably seated in the opening to permit a transverse movement of that angle member wherewith said other securing element is assembled; a casing; a base plate engaging the longitudinal edges of the casing; a fixed binding strip inserted between one edge of the casing and the rim band and engaged by one angle member; a removable binding strip inserted between the other edge of the casing and the rim band and engaged by the other angle member; and an adjustable connection between the upright flanges of the angle members, both of the binding strips comprising a plurality of parts having spaced ends defining openings through which the adjustable connection passes.

2. In a device of the class described, a felly; a rim band thereon and having its lateral edges disposed beyond the edges of the felly; angle members comprising upright flanges, and transverse flanges coacting with the inner face of the rim band; means for connecting the angle members; a casing; a base plate located within the casing; and binding strips inserted between the casing and the rim band and engaged by the upright flanges of the angle members, one binding strip being removable.

3. In a device of the class described, a rim band; a pair of beads disposed along the longitudinal edges of the rim band; a pair of binding strips disposed in the angles defined by the beads and the rim band, one binding strip being removable; a casing located between the beads and engaged by the strips; and a connection between the beads, each binding strip comprising a plurality of parts having their ends spaced to define openings in which the connection is located.

4. In a device of the class described, a rim band; an angle member applied to one longitudinal edge of the rim band; a securing element uniting the angle member with the rim band; a binding strip disposed upon the rim band and overlapped upon the securing element; a second securing element uniting the binding strip with the rim band; a movable binding strip located adjacent the other longitudinal edge of the rim band; a bead coöperating with the last specified binding strip; a connection between the bead and the angle member; and a tire engaged by the binding strips.

5. In a device of the class described, a felly; a rim band thereon and having its lateral edges disposed beyond the side faces of the felly, one of the lateral edges of the rim band being provided with an opening; angle members comprising upright flanges and transverse flanges coacting with the inner face of the rim band; securing elements carried by the transverse flanges of the angle members, one of the securing elements being permanently connected with the rim band and the other securing element being movably mounted in the opening to permit a transverse movement of that angle member wherewith said other securing element is assembled; a tire surrounding the rim band; an adjustable connection between the upright flanges of the angle members; and binding strips inserted between the tire and the rim band, the binding strips comprising a plurality of parts having spaced ends defining openings in which the connection is located.

In testimony that we claim the foregoing as our own, we have hereto affixed our signatures in the presence of two witnesses.

JOHN W. BURGESS.
GEORGE F. BURGESS.

Witnesses:
C. B. BURNS,
H. P. LAUDER.

Copies of this patent may be obtained for five cents each, by addressing the "Commissioner of Patents. Washington, D. C."